United States Patent [19]

Smith

[11] 4,164,123
[45] Aug. 14, 1979

[54] SOLAR THERMAL ELECTRIC POWER PLANT

[76] Inventor: Otto J. M. Smith, 612 Euclid Ave., Berkeley, Calif. 94708

[21] Appl. No.: 717,641

[22] Filed: Aug. 25, 1976

[51] Int. Cl.² .................................. F03G 7/02
[52] U.S. Cl. .............................. 60/641; 60/659; 126/438; 165/104 S
[58] Field of Search .............. 60/653, 641, 667, 670, 60/659; 126/270, 271; 165/104 S, 104 M

[56] References Cited

U.S. PATENT DOCUMENTS

| | | | |
|---|---|---|---|
| 683,088 | 9/1901 | Wideen | 126/270 |
| 2,207,656 | 7/1940 | Cartwright et al. | 126/270 |
| 2,920,710 | 1/1960 | Howard | 60/641 |
| 2,933,885 | 4/1960 | Benedek et al. | 60/641 |
| 3,152,442 | 10/1964 | Rowekamp | 60/641 |
| 3,382,917 | 5/1965 | Rice | |
| 3,630,022 | 12/1971 | Jubb | 60/644 |
| 3,884,217 | 5/1975 | Wartes | 126/270 |
| 3,924,604 | 12/1975 | Anderson | 60/641 X |
| 3,927,659 | 12/1975 | Blake et al. | 60/641 X |
| 3,951,129 | 4/1976 | Brantley, Jr. | 126/271 |
| 3,965,683 | 6/1976 | Dix | 126/271 X |
| 3,979,597 | 9/1976 | Drucker | 60/641 X |
| 3,985,116 | 10/1976 | Kapany | 126/270 |
| 4,002,158 | 1/1977 | Radebold | 60/641 X |
| 4,004,574 | 1/1977 | Barr | 165/104 S |
| 4,071,079 | 1/1978 | Engelbrecht | 165/104 S |

Primary Examiner—Allen M. Ostrager
Assistant Examiner—Stephen F. Husar
Attorney, Agent, or Firm—Flehr, Hohbach, Test, Albritton & Herbert

[57] ABSTRACT

A solar thermal electric energy system utilizes a solar receptor having a double paned glass window with cooling liquid circulating therethrough. This serves as a window for a solar heat receptor cavity having a number of water or steam carrying tubes therein. A portion of the tubes operate at a temperature range suitable for heating boiler water and another portion of the tubes is at a higher temperature which serves as steam superheat. The liquid flowing through a pair of window panes is triethylene glycol and in addition to cooling the window has an index of refraction which matches the window to provide the most efficient conduction of solar energy to the heat recepting tubes behind the window. The power plant itself includes heat saving jackets around the steam headers to provide for boiler feed water preheat and has both high pressure and low pressure turbines to utilize most efficiently the water being heated by the solar receptors.

42 Claims, 9 Drawing Figures

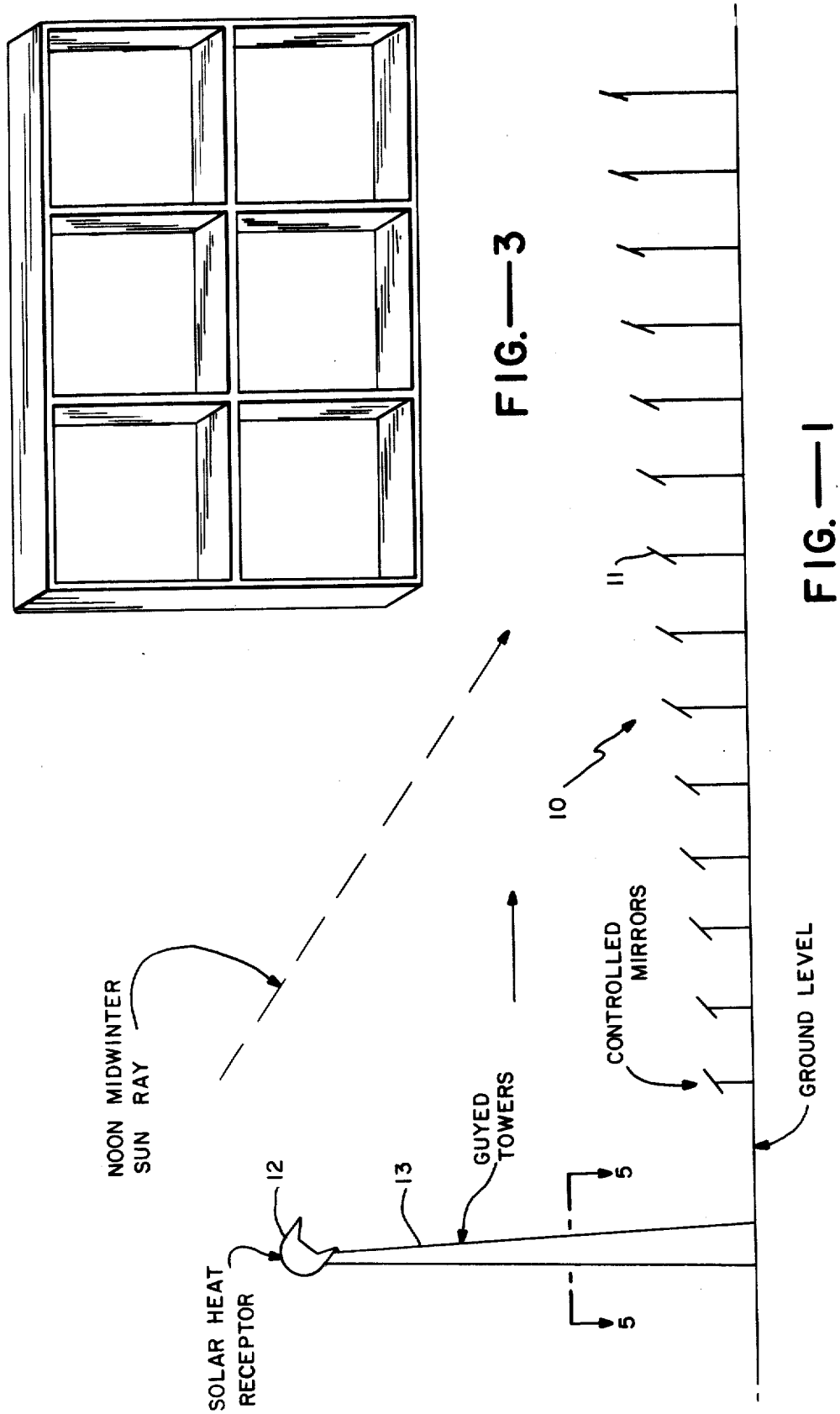

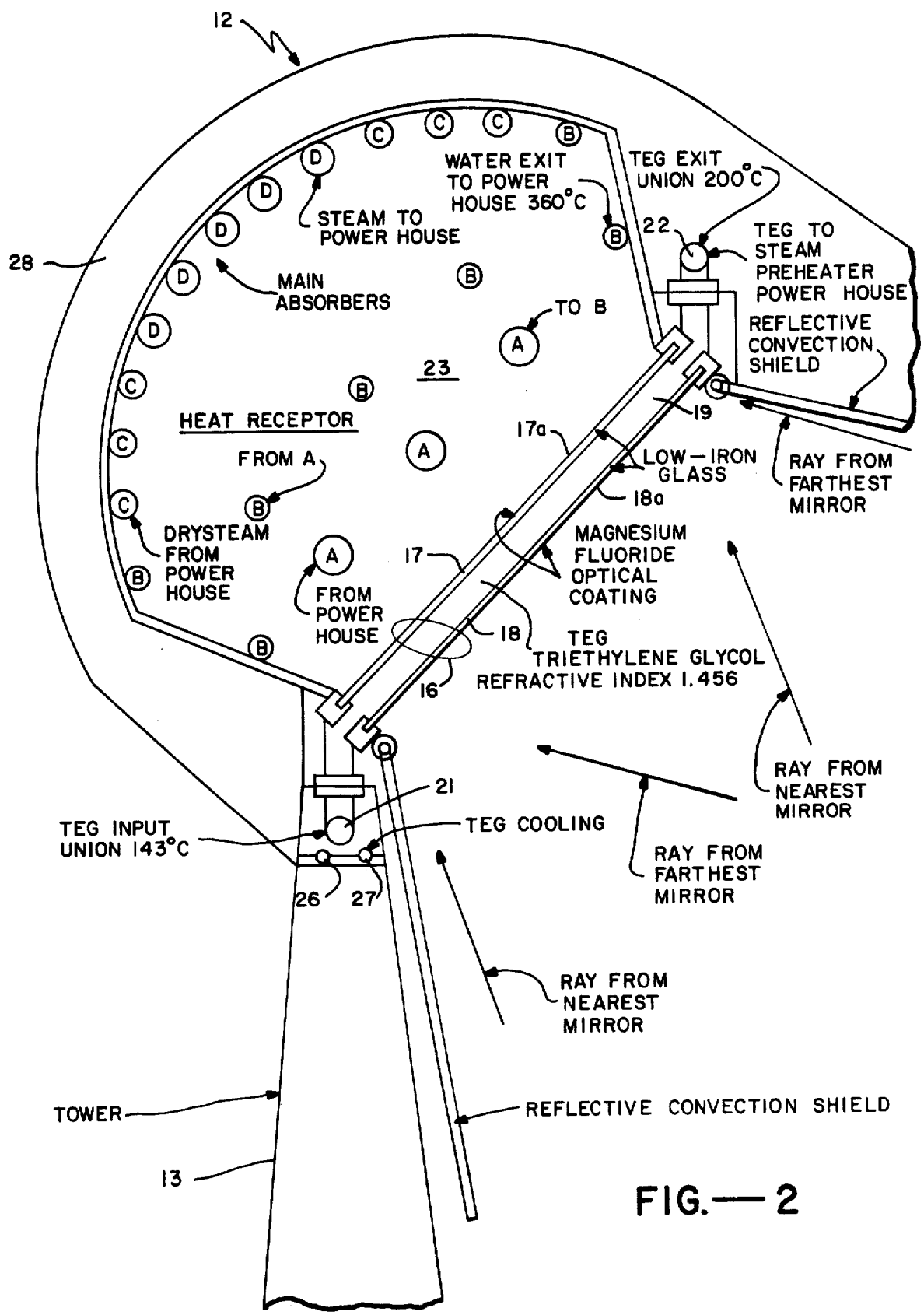
FIG.—2

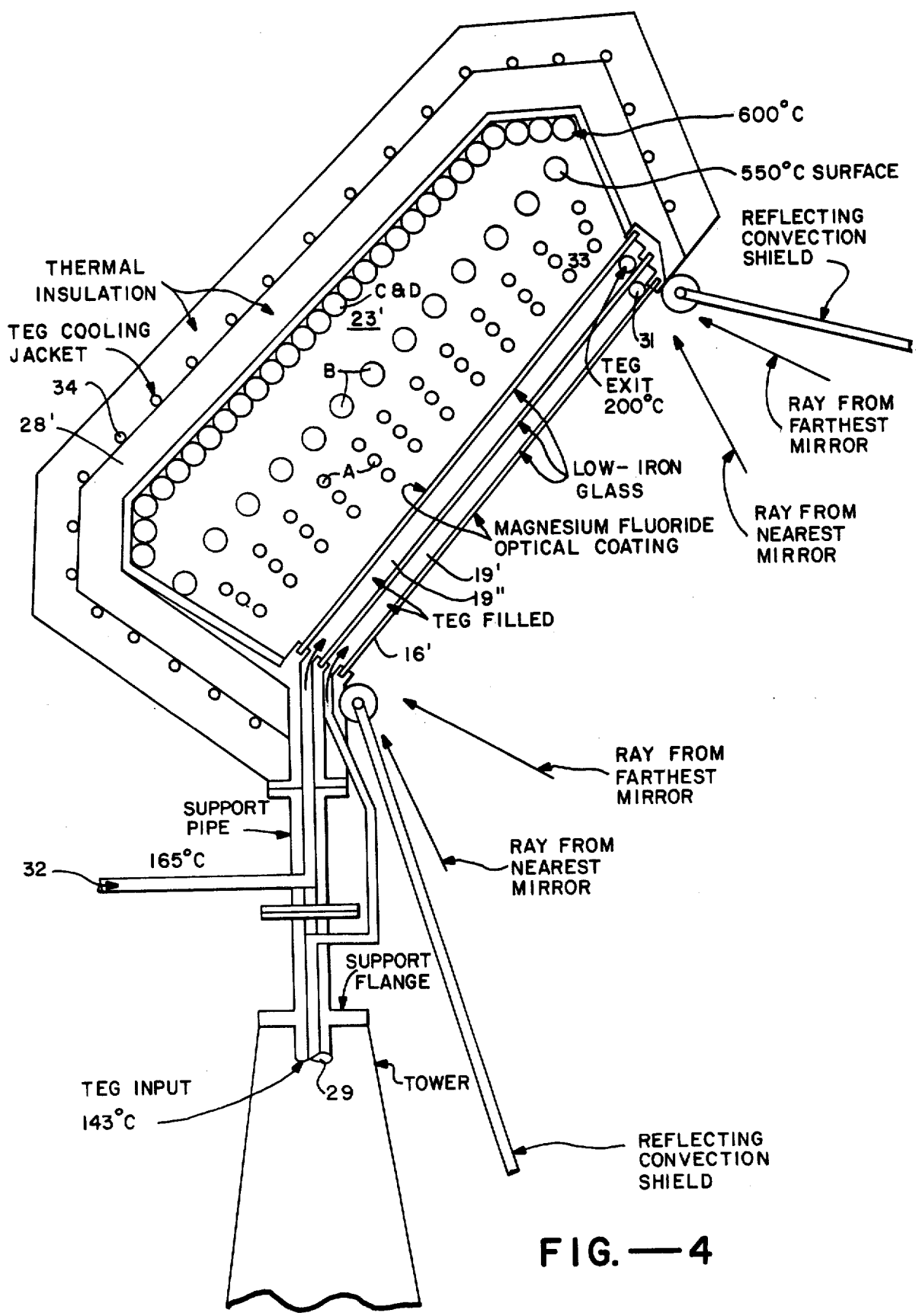
FIG.—4

A WATER TO RECEPTOR 300°C
B WATER FROM RECEPTOR 360°C
C STEAM TO RECEPTOR 335°C
D STEAM FROM RECEPTOR 500°C
E TEG TO WINDOWS 140°C
F TEG FROM WINDOWS 200°C
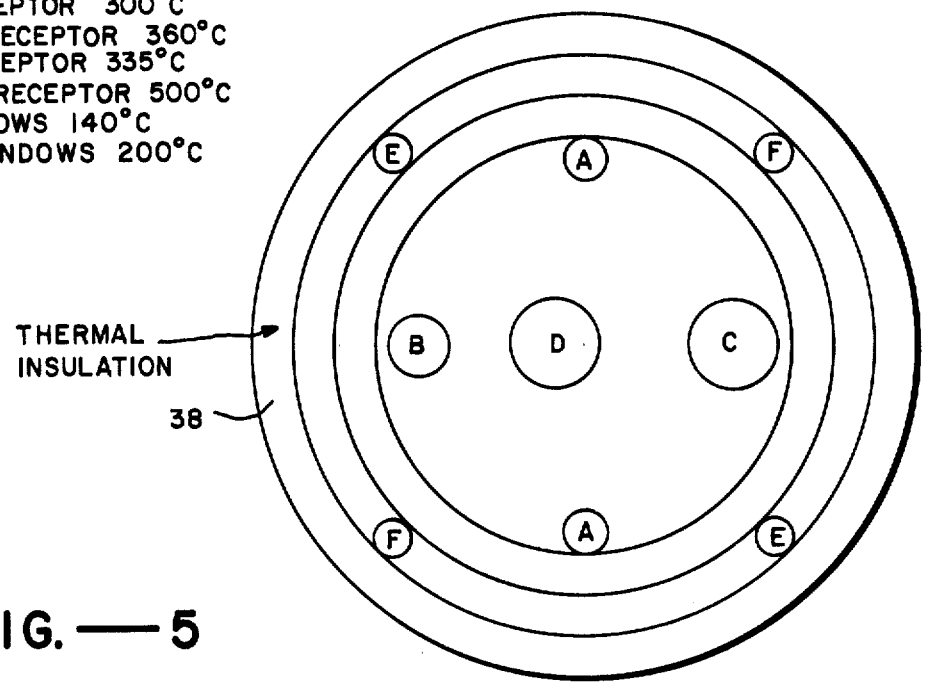
FIG.—5
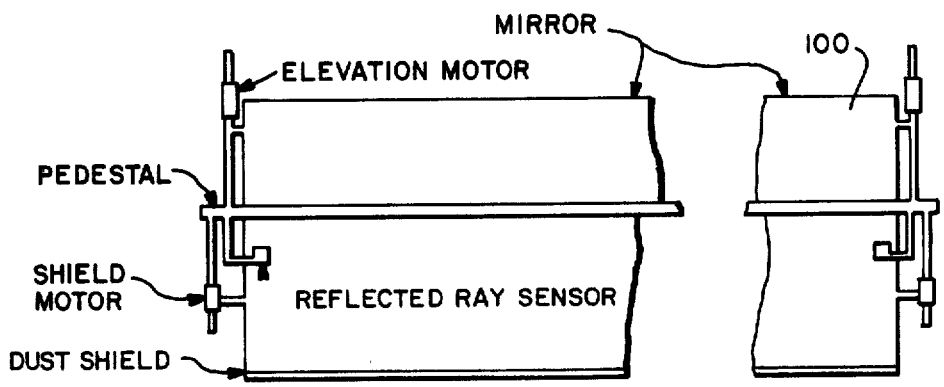
FIG.—8
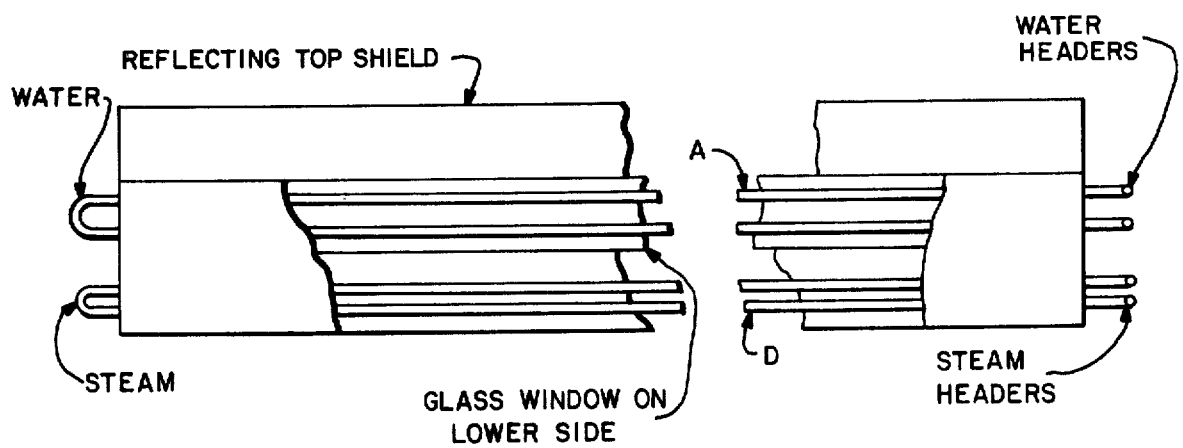
FIG.—9

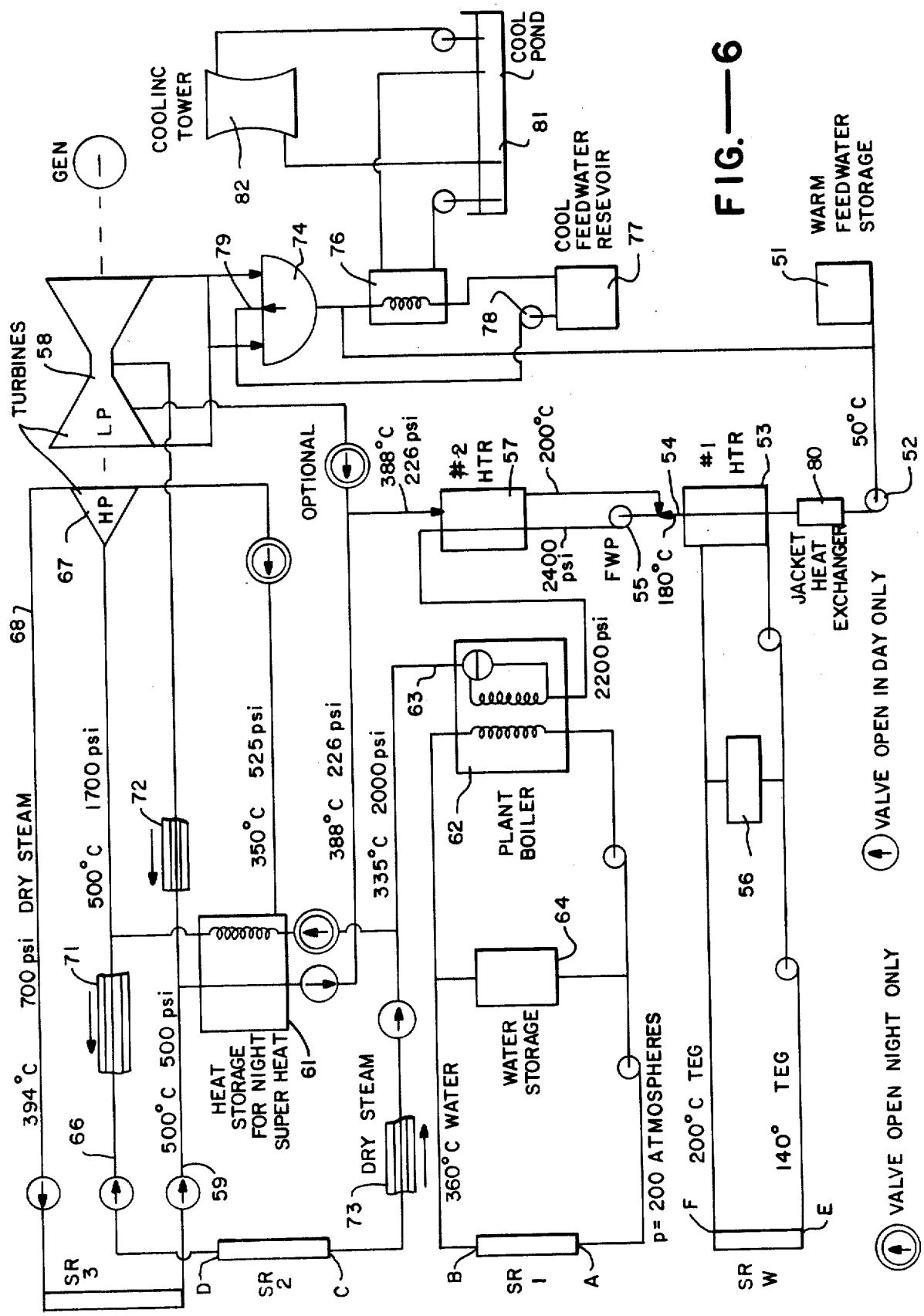
FIG.—6

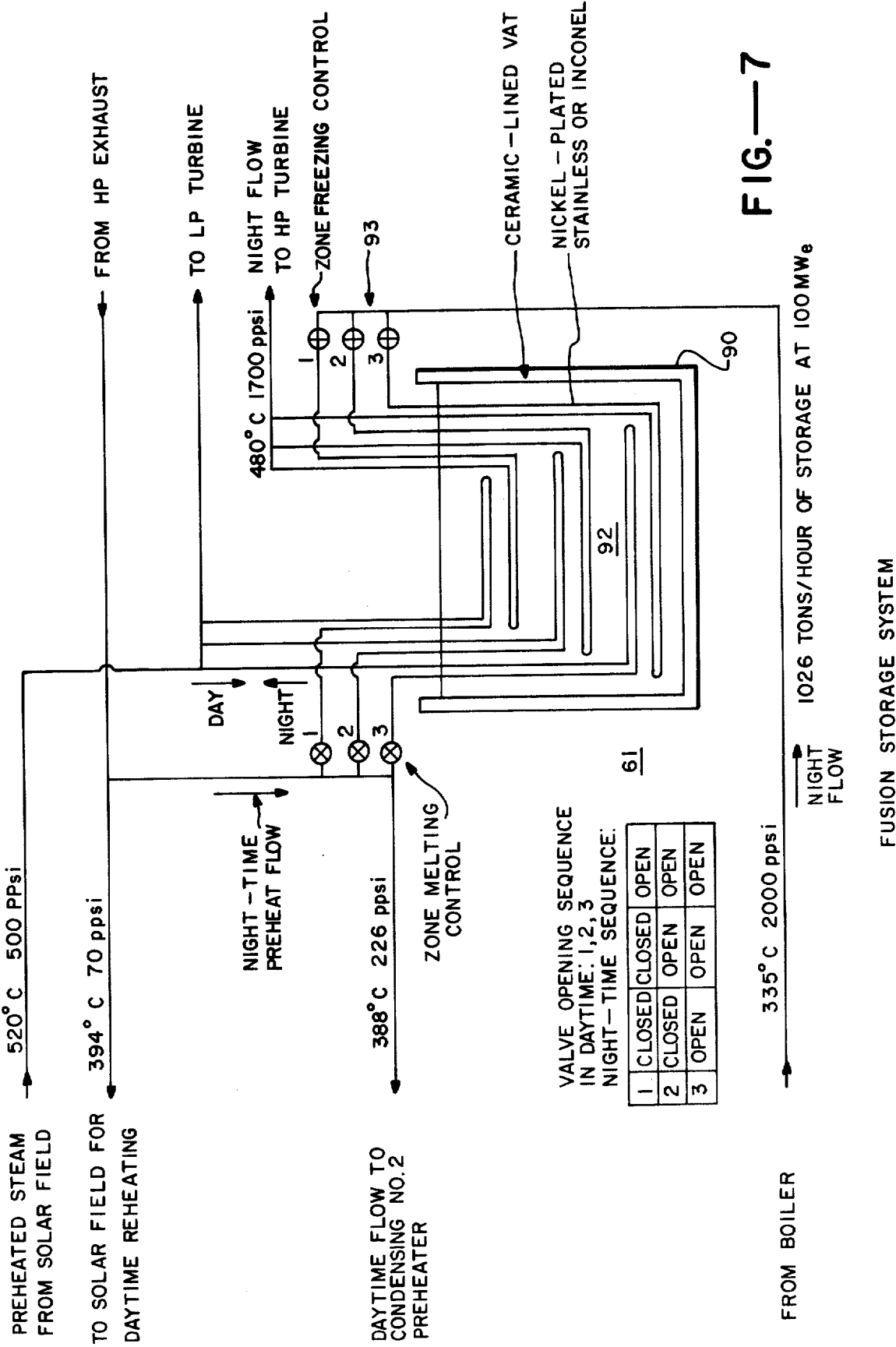

SOLAR THERMAL ELECTRIC POWER PLANT

BACKGROUND OF THE INVENTION

The present invention is directed to a solar thermal electric power plant. Such a power plant normally includes a solar collector, such as heliostatic mirrors, which concentrates the reflected sunlight on a number of receptors mounted on towers. Some type of fluid is heated in the receptor and connected to a steam turbine type power plant.

Prior designs of solar electric plants have been of a relatively small scale and have not been competitive with either large scale fossil fuel or nuclear fuel power plants. Solar power has, of course, obvious advantages over fossil fuel plants in that there is no depletion of nonrenewable resources and over nuclear power plants from both contamination and safety aspects.

OBJECTS AND SUMMARY OF THE INVENTION

It is, therefore, a general object of the present invention to provide an improved solar thermal electric power plant.

It is another object of the invention to provide a power plant which can be built at reasonable costs with available materials and conventional engineering design techniques.

In accordance with the above objects there is provided a solar energy system comprising solar collector means. Solar receptor means include a double paned window means with a flow space between the panes and positioned to receive solar energy from the solar collector means. Means provide for the flow of a cooling liquid in contact with the panes in the flow space.

BRIEF DESCRIPTION OF THE DRAWINGS

FIG. 1 is a simplified elevational view of solar collectors and a solar receptor embodying the present invention;

FIG. 2 is a detailed cross-sectional view of one embodiment of the solar receptor of FIG. 1;

FIG. 3 is a perspective view of an auxiliary structure of FIG. 2;

FIG. 4 is a detailed cross-sectional view of another embodiment of the solar receptor of FIG. 1;

FIG. 5 is a cross-sectional view taken along the line 5—5 of FIG. 1;

FIG. 6 is a schematic diagram of a power house used in the present invention; and FIG. 7 is a schematic cross-sectional view of the fusion storage system used in the power house of FIG. 6;

FIG. 8 is a plan view of a strip type solar reflecting mirror; and

FIG. 9 is a plan view, partially cut away, of a strip type solar receptor.

DETAILED DESCRIPTION OF THE PREFERRED EMBODIMENT

FIG. 1 is a simplified elevational view of a solar collector 10 which consists of a field of heliostatic (i.e., following the sun) tiltable mirrors 11 which focus and concentrate sunlight onto to a solar heat receptor 12 mounted on a tower 13. The configuration and design of the mirrors 11 in conjunction with the receptor 12 and tower 13 are described and claimed in a copending application in the name of the present inventor entitled Solar Collector System, filed Nov. 1, 1976, Ser. No. 737,489, now U.S. Pat. No. 4,117,682. In general, the mirrors face south and are automatically controlled to follow the movement of the sun to concentrate the maximum amount of solar energy during the day onto the solar heat receptor 12.

One form of receptor 12 is shown in cross-section in FIG. 2 and includes a double paned window 16 having separate glass panes 17 and 18 with a flow space 19 between the panes. The windows are typically of low iron glass and are coated on the outside, that is at the air glass interfaces 17a, 18a, with a magnesium fluoride optical coating to minimize reflection. The interpane space is filled with triethylene glycol (TEG) which enters the space at 21 and exits at 22. These inputs and exits are connected to the power plant to provide preheat for the power plant's boiler feedwater.

The preferred liquid to be used in the interpane space 19 is colorless so that it does not absorb energy from the sun and should have an index of refraction close to that of the panes 17 and 18. This allows the maximum amount of concentrated sunlight to enter the cavity area 23 behind the window 16. Thus, with a low iron glass window which has an index of refraction of approximately 1.50 one of the group of the following may be used (in addition to the TEG which has a refractive index of 1.456): butyrophenone, o-toluidine, chlorobenzene, diethylene glycol, triethylene glycol, tetraethylene glycol and trimethylene dibromide. In addition, a suitable mixture of two liquids can provide an equivalent refractive index.

Thus, in summary the double paned window structure performs a triple function: the interpane fluid provides valuable heat to the steam preheaters in the power house; the fluid cools the windows for extended life; and because of the relatively low temperature of the glass, the infrared and convection losses to the environment are greatly reduced. Moreover, because of the nearly equal refractive indices of the glass and fluid the reflection from the inside surfaces of the glass is negligible. Thus, the window transmits more than 95% of the solar energy to the heat receptors in the cavity 23.

Because of the importance of keeping the glass of the window cool the fluid pumping rate is controlled to hold the outlet temperature at 200° C.

The interpane fluid may also serve yet another purpose of cooling tower supports 13. The pipes 26 and 27 are in close thermal connection with the support tower (for example, welded to it) and are in series with the input union 21.

Cavity 23 is formed by the thermal insulation 28 which provide a semi-circular enclosure which terminates at the window 16. Within the cavity 23 are a number of water or steam carrying tubes which are coated with black heat absorbing material. The panel of tubes at the back of the cavity area 23 marked C and D are the main absorber of solar energy. The tubes in front designated A and B form a lower temperature screen and they intercept only about half of the incoming light. The visible light reflection from the front tubes is a major loss component and is kept low by the geometry of the cavity 23 and by a high absorption coating. Visible light reflected from the back panel is mostly absorbed by other tubes, but is also kept low by a high absorption coating. Specifically, tubes A and B are coated with a low infrared emmissivity intermetallic aluminum-nickel and C and D with a high visible absorption coating of intermetallic aluminum-chromium. The tubes are typically constructed of stainless steel. The infrared radiation from the back of the panel in the C and D tubes' location is mostly absorbed by the walls, by other back tubes and by the front tubes. The infrared radiation by the front tubes A and B is absorbed by the window 17. However, this radiation is kept low by the relatively low tube temperature. For example, the incoming fluid such as water might enter at 320° C. from the power house, circulates through the A tubes and then through the B tubes, indicated and exits at 360° C. The low emissivity coating for infrared on the front tubes minimizes heat transfer from the front tubes to the window.

High pressure water flows out from the power house in the A tubes at a minimum temperature and at 200 atmospheres pressure. Such high pressure prevents the water from boiling. In the solar receptor module the water is passed from the A to the B tubes reaching a maximum temperature of 360° C. and returned from the B tubes to the power house. Fifty-five percent of the heat required by the thermodynamic system is provided by this water. The heat exchange fluids flowing outside of the receptors are in certain headers which are heavily insulated. Thus, the conductive heat loss is negligible, and the piping costs in addition to the receptors is low.

Dry steam flows out from the power house in the C tubes and returns through the D tubes. These are the tubes in the rear portion of the cavity 23 as opposed to the intermediate location of the A and B tubes. The radiation heat exchanges in the receptor cavity 23 are a net flow from the D tubes to the A and B tubes and the window. Thirty-one percent of the heat required by the thermo-dynamic system is provided by the returning dry steam in the D tubes which exits at 500° C.

Because the pressure is above atmospheric in the interpane fluid and the space 19, a static pre-stress frame illustrated in FIG. 3 may be placed in contact with the surface 18a of window 16. This prevents deflection of the window due to the triethylene glycol fluid changing its pressure. The frame of FIG. 3 consists of several supports with a single horizontal support but may include many other similar rigid configurations.

FIG. 4 shows a variation of the heat receptor of FIG. 2 with a rectangularly shaped cavity 23'. However, the major change is a window 16' which includes a plurality of sandwiched double paned windows with the cooling liquid flowing successively from the outer panes to the inner panes. Specifically, the first input at 29 is shown as being at 143° C. which passes through the first interpane space 19' and exits at exit 31 at 165° C. It is then coupled to a fluid input 32 the fluid circulating through the interior interpane space 19'' exiting at 33 at 200° C. The advantage of this construction is that a larger temperature difference may be allowed between the input and outputs of the cooling fluid. In addition, since the outer pane facing the solar collectors can be relatively cooler less energy is re-emitted.

The embodiment of FIG. 4 also includes a cooling jacket formed of the pipes 34 embedded in thermal insulation 28' through which the TEG liquid circulates. This provides for greater efficiency since heat normally lost from the cavity 23' is utilized in the boiler water preheat function.

Because of the widely differing temperatures of both the water and super-heated steam circulating in the heat receptor it is most efficient to fully insulate all pipes leading to and from the tower 13 and moreover to utilize any heat loss that exists through the insulation as a preheat for lower temperature liquids. This is illustrated in FIG. 5 which is a typical piping bundle to the tower or in the associated access tunnels. It shows the various piping A through F with the D piping, for example, at the relatively high temperature of 500° C. which is steam exiting the tower for the power plant. Several layers of thermal insulation 38 surround the pipes. In general the incoming pipes going to the tower are heated by the oppositely flowing liquid which is at a higher temperature. The various fluids and their temperatures are shown by the associated table in FIG. 5.

FIG. 6 illustrates a typical power plant using the heat receptors of either FIGS. 2 or 4. The various solar receptors are indicated as $SR_W$, which refers to the solar receptor 16 or 16'; in other words, the TEG liquid flowing through the double paned windows, and as solar receptors $SR_1$, $SR_2$ and $SR_3$ which are water or steam tubes of increasingly higher temperatures which are taken from the appropriate sections of the heat receptor cavity 23.

Referring now to the specific building blocks of the power plant a warm feedwater reservoir unit 51 which is at approximately 50° C. has its output pressure raised to 200 psi by a first feedwater pump 52 and passes through a first preheater 53. This preheater is a heat exchanger for the low pressure TEG for $SR_W$ which is the heat source. As indicated, the triethylene glycol exits preheater 53 at 140° C., is circulated through the window solar receptor and heated to 200° C. and returned to preheater, it thus acts as a heat source for raising the feed water temperature to 180° C. at the exit 54. A storage unit 56 is in parallel with the incoming and outgoing TEG pipes.

A second feedwater preheater 57 pumped by a second feedwater pump 55 is a condensing heat exchanger using turbine exhaust as indicated at 388° C. and 226 psi. A bleed from an intermediate stage of the low pressure turbine 58 is used at night and a bleed from an incoming line 59 through a heat storage unit 61 is used during the day. Such routing is done by valves with the indicated nomenclature for valve open in day only and valve open at night only. Heat storage unit 61 may use molten metal and provide for operation of the solar plant during peak energy hours.

A third heater 62 is actually the plant boiler which receives 360° C. water at 3,900 psi from the solar receptor field $SR_1$ and boils the water in the plant boiler to 335° C. at 2,000 psi as indicated at the exit 63. Thus, dry steam is produced. Solar receptor $SR_1$ referring to FIG. 2 includes the A tubes at its low temperature end and the B tubes at its high temperature end. Water is used as the heat exchange fluid in this stage because of the abundance of experience in the use of this conventional technology. A water storage unit 64 is provided in parallel between the input and output lines of the plant boiler 62.

The next stage is a super heater and includes the solar receptor $SR_2$ which has as its input steam from exit line 63 of the plant boiler 62 which flows into the C tubes, referring to FIG. 2, of the solar heat receptor, is heated to a higher temperature by the D tubes, then exits on the line 66 at 1,700 psi and 500° C. and supplies high pressure turbine 67. The exhaust 68 from high pressure turbine 67 which is at 394° C. and 700 psi is reheated in a solar receptor $SR_3$ to 500 psi, 500° C. on line 59 and used as the input to the low pressure turbine 58. This reheat is provided by a suitable bank of solar receptors especially for that purpose and is described in detail and claimed in the above copending application.

In order to provide for high system efficiency all of the stream headers have jackets 71, 72 and 73 surrounding them for intercepting any heat from the steam headers which would otherwise be lost. Fluid flow in the jackets is in the opposite direction to the steam flow in order to provide an uphill temperature gradient. The fluid from the jackets 71, 72 and 73 is the heat source of a heat exchanger 80 which is inserted immediately after feed water pump 52. Thus, the feed water is raised perhaps by 10° C.

The low pressure turbine 58 exhausts into a spray condenser 74 at 1.84 psi absolute and 50° C. Some of the warm condensate is stored in a warm feed reservoir 51. However, most of the warm condensate is pumped through a heat rejection exchanger 76, a cool feed water reservoir 77 and then by means of a pump 78 back to the condenser 74 serving as the liquid spray for the condenser at the spray input 79. The heat rejection exchanger 76 rejects its heat into a cool pond or reservoir 81 which is kept cool by a dry cooling tower 82. The pond can be large enough to have a time constant of approximately one week and is to be protected or shaded from solar radiation so that it does not heat up during the day. The dry cooling tower has an effective time of operation at night and during high wind velocity conditions. Gravity separation can be used in the reservoirs so that the coolest bottom layer is used in the heat rejection exchanger and the high temperature water is fed into the top layer. The tower pumps from the top layer and feeds into the bottom layer, as illustrated. The dry cooling tower does not need a high power fan because it is not required to reject heat during the day time when air temperatures are high. It operates primarily when the air temperatures are low, or when the wind-augmentation is sufficient.

In general, all of the flows and parameters of the power plant of FIG. 6 in conjunction with the solar receptors of FIGS. 2 and 4 can be efficiently controlled by an extremum control system. That is, for example, all of the flows of either steam or water through the solar heat receptors can be shifted slightly, the total output or efficiency of the system measured and if this is a positive change, the change can be made permanent. This can be done until the peak of the extremum curve is reached. The same can be done with other inter-related operating portions of the system such as the actual electrical output, and various steam inputs to the turbine. For example, first and second feedwater pumps 52 and 54 can be controlled to maximize the heat energy sensed by sensor means of the superheated steam at the throttle of the turbine.

Heat storage unit 61 is illustrated in greater detail in FIG. 7. A ceramic lined vat 90 contains a mixture of 30% Al and 70% Zinc at a nominal temperature of 510° C. A zone melting control unit has three sequence valves 91 which provide heating fluid to three associated coils 92 each in its own zone of the vat 90; i.e., the zones are of increasing depth. The valve opening sequence in the daytime starts with valve 1 with the most shallow coil etc. A zone freezing control unit 93 has three similar valves for recovering heat during the night time.

FIGS. 8 and 9 illustrate a strip type of solar reflecting mirror 100 (FIG. 8) which is associated with a strip type heat receptor (FIG. 9). Such receptor is similar in construction to the receptors of FIGS. 2 and 4 except that it may be 100 meters long. This type of construction is easy to build and is believed to be more efficient for smaller power plants.

Thus, an improved solar electric system has been provided which is highly efficient and practical.

What is claimed is:

1. A solar energy system comprising solar collector means consisting of a plurality of controllable mirrors, solar receptor means including thermally insulated cavity forming means with a light entrance facing downward and away from the equator and including double paned window means across said entrance, where the outermost pane is exposed to the environment, with a flow space between major surfaces of said panes and positioned to receive solar energy from said solar collector means means for providing for the flow of a cooling liquid in thermal contact with substantially all of one major surface of each of said panes said flow providing a significant transfer of thermal energy from said panes to said liquid for minimizing heat loss from said outermost pane to the environment, antireflection means consisting of a tranparent antireflection coating on each air-to-pane interface of said planes, tube means consisting of a plurality of fluid carrying tubes within said cavity heated by the solar energy passing through said entrance, a power plant with a working fluid driving a thermodynamic prime mover, means for pumping said cooling liquid to said power plant and through heat exchanger means to deliver thermal energy to said working fluid, and means for pumping a heat transfer fluid through said tubes and to said power plant and through second heat exchanger means to deliver thermal energy to said working fluid.

2. A system as in claim 1 where said liquid is colorless and has an index of refraction close to that of said panes.

3. A system as in claim 2 where said window panes are low iron glass for minimizing absorption of visible light.

4. A system as in claim 1 including static prestress means in contact with said window pane facing said solar collector means for preventing deflection of said window due to pressure changes in said cooling fluid.

5. A system as in claim 1 where said insulated cavity forming means includes embedded pipes with said cooling liquid flowing therethrough.

6. A system as in claim 1 where said coating is magnesium fluoride.

7. A system as in claim 1 where said solar receptor means includes a plurality of sandwiched window panes with said cooling liquid flowing successively from thermal contact with said outer panes to thermal contact with said inner panes.

8. A system as in claim 1 where one of said fluid carrying tubes carries liquid water pressurized sufficiently to prevent boiling.

9. A system as in claim 1 where one of said fluid carrying tubes carries dry steam.

10. A system as in claim 1 where said liquid is pumped at a rate to maximize the heat input to said working fluid.

11. A system as in claim 1 where said power plant means has a steam turbine and a first heat exchanger, means for receiving said cooling liquid for preheating boiler water for said turbine, and a second heat exchanger means for receiving the heated fluid from said tube means for boiling the said boiler water into steam for said turbine.

12. A system as in claim 1 including where said tubes are divided into two groups, the first group carrying said pressurized first liquid, and the second group carrying a working fluid, means for pumping said pressurized first liquid through said heat exchanger means to vaporize said working fluid, means for providing for the flow of said vaporized working fluid through said second group of tubes to be superheated, and means for directing said superheated-vaporized working fluid to said turbine.

13. A system as in claim 1 where said power plant includes heat storage means in the form of a vat holding meltable metal together with zone melting control means for selectively melting distinct zones of metal in said vat, a souce of steam, and means for controlling the flow of said steam through said distinct zones and directing such steam to said prime mover.

14. A system as in claim 1 where said solar collector means is extremely elongated in the horizontal direction east and west with respect to its height and the associated receptor is similarly extremely elongated with respect to its height, a plurality of elevation motor means, each one of said controllable mirrors mechanically connected to an associated motor means to individually control the elevation angle of said one mirror, said mirrors being strip mirrors with the major axis in the east-west direction and with a physical separation in the north-south direction between said mirrors.

15. A solar energy system comprising solar collector means consisting of a plurality of controllable mirrors, solar receptor means including thermally insulated cavity forming means with a light entrance facing downward and away from the equator and including double paned window means across said entrance with a flow space between major surfaces of said panes and positioned to receive solar energy from said collector means, means for providing for the flow of a cooling liquid in thermal contact with substantially all of one major surface of each of said panes, antireflection means consisting of a transparent antireflection coating on each air-to-pane interface of said panes, tube means consisting of a plurality of fluid carrying tubes within said cavity heated tube by the solar energy passing through said entrance, a power plant with a working fluid driving a thermodynamic prime mover, means for pumping said cooling liquid to said power plant and through heat exchanger means to deliver thermal energy to said working fluid, and means for pumping a heat transfer fluid through said tubes and to said power plant and through second heat exchanger means to deliver thermal energy to said working fluid, where said window panes are low iron glass, and where said cooling liquid is one of the group consisting of diethylene glycol, triethylene glycol, tetracethylene glycol, butyrophenone, o-toluidine, chlorobenzene, and trimethlene dibromide.

16. A solar energy system comprising solar collector means consisting of a plurality of controllable mirrors, solar receptor means including thermally insulated cavity forming means with a light entrance facing downward and away from the equator and including double paned window means across said entrance with a flow space between major surfaces of said panes and positioned to receive solar energy from said solar collector means, means for providing for the flow of a cooling liquid in thermal contact with substantially all of one major surface of each of said panes, antireflection means consisting of a transparent antireflection coating on each air-to-pane interface surface of said panes, tube means consisting of a plurality of fluid carrying tubes within said cavity heated by the solar energy passing through said entrance, a power plant with a working fluid driving a thermodynamic prime mover, means for pumping said cooling liquid to said power plant and through heat exchanger means to deliver thermal energy to said working fluid, and means for pumping a heat transfer fluid through said tubes and to said power plant and through second heat exchanger means to deliver thermal energy to said working fluid, including tower means for supporting said solar receptor means, pipes for carrying said cooling liquid, a portion of said pipes being in solid thermal connection with said support tower means for cooling said tower means.

17. A solar energy system comprising solar collector means consisting of a plurality of controllable mirrors, solar receptor means icluding thermally insulated cavity forming means with a light entrance facing downward and away from the equator and including double paned window means across said entrance with a flow space between major surfaces of said panes and positioned to receive solar energy from said solar collector means, means for providing for the flow of a cooling liquid in thermal contact with substantially all of one major surface of each of said panes, antireflection means consisting of a transparent antireflection coating on each air-to-pane interface of said panes, tube means consisting of a plurality of fluid carrying tubes within said cavity heated by the solar energy passing through said entrance, a power plant with a working fluid driving a thermodynamic prime mover, means for pumping said cooling liquid to said power plant and through heat exchanger means to deliver thermal energy to said working fluid, and means for pumping a heat transfer fluid through said tubes and to said power plant and through second heat exchanger means to deliver thermal energy to said working fluid where said tube means includes a plurality of first tubes within said cavity at a maximum distance from said window means, carrying a first heat exchange fluid at a high temperature, and also includes a plurality of second screen tubes carrying a second heat exchange fluid at a second temperature intermediate between said high temperature and the temperature of said cooling liquid, said second screen tubes being located in said cavity intermediate between said first tubes and said window means.

18. A solar energy system comprising adjustable solar collecting means; solar receptor means including an insulated cavity with a light entrance facing downward and away from the equator to receive solar light reflected from said collector, said cavity containing a plurality of fluid carrying tubes heated by the solar energy passing through said entrance, one of said tubes carrying a first liquid sufficiently pressurized to prevent said first liquid from boiling, window means forming said light entrance and comprising a second liquid confined within transparent walls, said outermost transparent wall being exposed to the environment, and means for pumping said second liquid to a preheater heat exchanger for said first liquid the flow of said liquid providing a significant transfer of thermal energy from said walls to said second liquid for minimizing heat loss from said outermost wall to the environment whereby the infrared reradiation loss from said tubes toward said light entrance is recovered.

19. A solar energy system comprising solar collector means; solar receptor means including double-paned windown means with a flow space between said panes and positioned to receive solar energy from said solar collector means; and means for providing for the flow of a cooling liquid in contact with said panes in said flow space, where said receptor means includes insulated energy cavity forming means behind and attached to said window means, said cavity containing a plurality of fluid carrying tubes heated by the solar energy passing through said window means, where said tubes are divided into high and intermediate temperature groups, the high temperature group tubes being coated with a high visible absorption coating and the intermediate temperature group being coated with a low infrared emissivity coating.

20. A system as in claim 19 including tower means for supporting said solar receptor means and for carrying said fluid-carrying tubes for termination at a power plant together with insulation surrounding said tubes having pipes embedded therein with cooling liquid flowing therethrough said liquid providing a preheat for the working fluid of said power plant.

21. A system as in claim 19 where said high visible absorption coating is intermetallic Al-Cr and said low infrared emissivity coating is intermetallic Al-Ni.

22. A solar energy system comprising solar collector means; solar receptor means including double-paned window means with a flow space between said panes and positioned to receive solar energy from said solar collector means; and means for providing for the flow of a cooling liquid in contact with said panes in said flow space, including power plant means having a steam turbine and heat exchanger means for receiving said liquid heated between said window means for preheating boiler water for said steam turbine, where steam headers couple steam to said turbine and including heat removing jackets surrounding said headers from a fluid flowing therethrough such fluid providing, by means of a second heat exchanger, boiler water preheat.

23. A solar energy system comprising solar collector means and power plant means having a steam turbine, solar receptor means including an insulated cavity forming means behind and attached to a window means, said cavity containing a plurality of fluid carrying tubes heated by the solar energy passing through said window means, means for transferring the heat energy stored in said heated fluid to steam for said steam turbine, and storage means for storing the heat energy from said heated fluid, consisting of vat means containing a meltable metal, means for melting said meltable metal using said heat energy, first pipe means in a first zone within said vat, second pipe means in a second zone within said vat, first valve means to control the flow of said steam through said first pipe means until said metal in said first zone is fused, and second valve means to control the flow of said steam through said second pipe means until said metal in said second zone is fused.

24. A solar energy system comprising solar collector means and power plant means having a steam turbine, solar receptor means including an insulated cavity forming means behind and attached to a window means, said cavity containing a plurality of fluid carrying tubes heated by the solar energy passing through said window means, said tubes heating said fluid to produce a heated fluid, means for delivering said heated fluid to said power plant means, heat exchanger means for transferring the heat energy stored in said heated fluid to steam for said steam turbine, and storage means for storing some of the heat energy from said heated fluid, consisting of vat means containing a meltable metal, means for melting said meltable metal using said heat energy, first pipe means near the bottom of said vat, second pipe means in the middle of said vat and third pipe means near the top of said vat, all pipe means immersed in said metal, and valving means to freeze said metal and remove heat of fusion energy from said metal, said varying means causing said steam to flow first through said first pipe means, and then at a later time causing said steam to flow through said second pipe means, and then lastly causing said steam to flow through said third pipe means.

25. A solar energy system comprising controllable mirrors to concentrate the solar radiation, solar receptor means, and power plant means containing a working fluid driving a thermodynamic prime mover; said solar receptor means including a double paned window means with a flow space between major surfaces of said panes, positioned to receive solar energy from said mirrors, means providing for the flow of a transparent fluid in thermal contact with substantially all of one major surface of each of said panes, said solar receptor means including insulated cavity forming means behind and attached to said window, said cavity forming means containing pipe means carrying a heat transfer fluid, said pipe means coated with a selectively absorbing film with higher absorptivity of visible solar radiation than emissivity of infrared radiation, said power plant means containing means for transferring thermal energy from said transparentfluid to said working fluid for said thermodynamic prime mover, and means for transferring thermal energy from said heat transfer fluid to said working fluid for said thermodynamic prime mover, wherein said pipe means is divided into two subgroups, the high-temperature subgroup being a close array of pipes on the inside wall of said cavity most distant from said window, and a lower-temperature subgroup being an open array of pipes located intermediate between said window and said high-temperature subgroup, closer to said window than to said high-temperature subgroup, the spacing between individual elements of said open array of pipes being greater than the diameter of said elements.

26. A solar energy system comprising solar collector means, solar receptor means, and power plant means containing a working fluid driving a thermodynamic prime mover; said solar receptor means including a double paned window means with a flow space between major surfaces of said panes, positioned to receive solar energy from said collector means, means for providing for the flow of a transparent fluid in thermal contact with substantially all of one major surface of each of said panes, said solar receptor means including insulated cavity forming means attached to said window, said cavity forming means containing pipe means carrying a heat transfer fluid said heat transfer fluid being heated by the solar energy passing through said window and being absorbed by said pipe means, said pipe means being divided into two subgroups, a first subgroup being an array of pipes closely spaced together, in line with the rays of radiation entering the cavity from the window, and at the maximum distance from the window inside of the said cavity, and a second subgroup being an array of pipes closer to the window than to the said first subgroup, and spaced to permit at least half of the incident radiation to pass through said second subgroup to said first subgroup, said power plant means containing heat exchanger means for transferring thermal energy from said transparent fluid to said working fluid, means for transferring thermal energy from said heat transfer fluid to said working fluid for said thermodynamic prime mover.

27. A solar energy system as in claim 26 wherein said heat transfer fluid ies pumped from said power plant to the said solar receptor means, and flow first through said second subgroup of pipes, its temperature being increased by the absorption of solar energy, and then said heat transfer fluid flows through said first subgroup of pipes, its temperature being further increased by the flow of additional thermal energy from the solar radiation through the walls of said pipes in said first subgroup.

28. A solar energy system as in claim 26 wherein said pipes in both said first and second subgroups are coated with a selectively absorbing coating where absorptivity of visible solar radiation is greater than the emissivity of infrared radiation of said cooling.

29. A solar energy system as in claim 26 wherein said window is comprised of panes of low-iron glass coated on the glass-to-air interfaces with a selective coating to reduce the visible light reflectivity of said glass-to-air interface.

30. A solar energy system as in claim 26 wherein said power plant means contains a heat storage vat, annd means for transferring thermal energy from said heat transfer fluid into said heat storage vat, and means for transferring thermal energy from said heat storage vat into said working of fluid.

31. A solar energy system as in claim 32 in which said first and second fluids are chemically identical, but said second fluid is lower in temperature than said first fluid.

32. A solar energy system as in claim 26 wherein said first subgroup of pipes carry a first fluid, and wherein said second subgroup of pipes carry a second fluid, and wherein the surface temperatures of the pipes in said second subgroup are significantly lower than the surface temperatures of the pipes in said first subgroup, and wherein the solar energy collected by the heated first and second fluids is delivered to said working fluid in said power plant.

33. A solar energy system as in claim 32 in which one of said first and second fluids is said working fluid.

34. A solar energy system as in claim 31 in which the effluent of said second fluid from said second subgroup is the supply of said first fluid into said first subgroup of pipes.

35. A solar energy system as in claim 26 wherein said first subgroup of pipes carry a first fluid, and wherein said second subgroup of pipes carry a second fluid, first pumping means for pumping said second fluid through a first heat exchanger means in said power plant to deliver intermediate temperature thermal energy to said working fluid, and second pumping means for pumping said first fluid through a second heat exchanger means in said power plant to deliver high temperature thermal energy to said working fluid.

36. A solar energy system comprising solar collector means, solar receptor means, and power plant means containing a working fluid driving a thermodynamic prime mover; said solar receptor means including a double paned window means with a flow space between major surfaces of said panes, positioned to receive solar energy from said collector means, means for providing for the flow of a transparent fluid in thermal contact with substantially all of one major surface of each of said panes, said solar receptor means including insulated cavity forming means attached to said window, said cavity forming means containing a first array of pipes and a second array of pipes, said first array of pipes being a grid with a spacing beteeen the pipes sufficient to permit at least half of the incident radiation to pass between the pipes, said first array of pipes being located within said cavity such that said solar energy passing through said window will be incident upon said first array, said second array of pipes being located within said cavity such that said first array is geometrically intermediate between said window and said second array, and such that some of the shadows of said first array fall on said second array, but none of the shadows of said second array fall on said first array, means for pumping a first fluid through said first array, means for pumpting a second fluid through said second array, first heat exchanger means in said power plant to deliver thermal energy from said transparent fluid to said working fluid, second heat exchanger means to deliver thermal energy from said first fluid to said working fluid, said second fluid receiving thermal energy from the portion of said solar energy passingthrough said spacing of said first array, and being absorbed by said second array, and means for said second fluid to deliver energy to said thermodynamic prime mover.

37. A solar energy system as in claim 36 wherein said panes are made of low-iron glass coated on the glass-to-air interfaces with a selective antireflection coating to reduce the visible light reflectivity of said glass-to-air interface.

38. A solar energy as in claim 36 wherein the pipes of said first array of pipes are coated with a selectively absorbing coating whose absorptivity of visible solar radiation is greater than the emissivity of infrared radiation of said coating.

39. A solar energy system as in claim 36 wherein said power plant means contains for the storage of heat energy, and means for transferring thermal energy from said second fluid to said means for the storage of heat energy, and means for transferring thermal energy from said means for the storage of heat energy to said working fluid.

40. A solar energy system as in claim 39 wherein said means for the storage of heat energy comprises a thermally insulated vat with a meltable metal, first tube means in a first zone within said vat, second tuve means in a second zone within said vat, first valve means to control the flow of said working fluid through said first tube means until said metal in said first zone is fused, and second valve means to control the flow of said working fluid through and second tube means until said metal in said second zone is fused.

41. A solar energy system as in claim 36 wherein said second fluid is said working fluid.

42. A solar energy system as in claim 39 wherein said second fluid is said working fluid.

* * * * *